(12) United States Patent
Pannwitz et al.

(10) Patent No.: US 10,530,612 B2
(45) Date of Patent: Jan. 7, 2020

(54) SUBSCRIBER STATION FOR A BUS SYSTEM AND METHOD FOR REDUCING LINE-RELATED EMISSIONS IN A BUS SYSTEM

(71) Applicant: Robert Bosch GmbH, Stuttgart (DE)

(72) Inventors: Axel Pannwitz, Radebeul (DE); Bernd Hilgenberg, Reutlingen (DE); Steffen Walker, Reutlingen (DE); Ingo Hehemann, Hagen A.T.W. (DE)

(73) Assignee: Robert Bosch GmbH, Stuttgart (DE)

( * ) Notice: Subject to any disclaimer, the term of this patent is extended or adjusted under 35 U.S.C. 154(b) by 654 days.

(21) Appl. No.: 15/033,919

(22) PCT Filed: Oct. 20, 2014

(86) PCT No.: PCT/EP2014/072415
§ 371 (c)(1),
(2) Date: May 3, 2016

(87) PCT Pub. No.: WO2015/067459
PCT Pub. Date: May 14, 2015

(65) Prior Publication Data
US 2016/0269200 A1    Sep. 15, 2016

(30) Foreign Application Priority Data
Nov. 8, 2013   (DE) .................. 10 2013 222 786

(51) Int. Cl.
*H04L 25/02*    (2006.01)
*H04L 12/40*    (2006.01)

(52) U.S. Cl.
CPC .......... *H04L 25/0274* (2013.01); *H04L 12/40* (2013.01); *H04L 2012/40215* (2013.01)

(58) Field of Classification Search
CPC .............. H04L 12/40; H04L 25/0274; H04L 2012/40215
See application file for complete search history.

(56) References Cited

U.S. PATENT DOCUMENTS 5,448,180 A * 9/1995 Kienzler ........... H04L 12/40006
                                              326/15
6,154,061 A * 11/2000 Boezen ................. H04L 25/028
                                              326/86

(Continued)

FOREIGN PATENT DOCUMENTS

CN    101523327 A    9/2009
CN    102210100 A    10/2011

(Continued)

OTHER PUBLICATIONS

International Search Report dated Jan. 29, 2015 of the corresponding International Application PCT/US2014/072415 filed Oct. 20, 2014.

*Primary Examiner* — Eric T Oberly
(74) *Attorney, Agent, or Firm* — Norton Rose Fulbright US LLP; Gerard Messina

(57) ABSTRACT

A subscriber station for a bus system and a method for reducing line-related emissions in a bus system are provided. The subscriber station includes an edge controller for symmetrizing switching edges in the bus system. The edge controller includes an element for generating a setpoint voltage characteristic on a bus in the bus system and a current mirror for transmitting the generated setpoint voltage characteristic to the bus.

6 Claims, 2 Drawing Sheets

(56) References Cited

U.S. PATENT DOCUMENTS

| | | | | |
|---|---|---|---|---|
| 2005/0135331 A1* | 6/2005 | Reindl | ............. | H04L 12/40032 370/351 |
| 2009/0001953 A1* | 1/2009 | Huang | .................. | G05F 1/575 323/281 |
| 2015/0097534 A1* | 4/2015 | Bhattad | ................. | G05F 1/462 323/270 |

FOREIGN PATENT DOCUMENTS

| | | |
|---|---|---|
| DE | 102050576 | 5/2004 |
| DE | 102004056305 | 7/2005 |
| JP | 2003124796 A | 4/2003 |
| RU | 2006138032 A | 5/2008 |
| WO | WO92/17017 | 10/1992 |
| WO | WO99/57810 | 11/1999 |

* cited by examiner

SUBSCRIBER STATION FOR A BUS SYSTEM AND METHOD FOR REDUCING LINE-RELATED EMISSIONS IN A BUS SYSTEM

FIELD

The present invention relates to a subscriber station for a bus system and a method for reducing line-related emissions in a bus system in order to meet the signal symmetrization requirements of the bus system.

BACKGROUND INFORMATION

The CAN bus is a differential bus system having high signal symmetrization demands. The better the signal symmetrization, the lower will be the interference emission and the interferences at a subscriber station such as a car radio, for example. Signals CAN_H and CAN_L, which are in phase opposition, must be controlled in such a way that their mean value deviates preferably little from mean voltage VCC5/2=2.5V.

Signal symmetrization is presently achieved by balancing the resistances of the switches to ground GND and to potential VCC5, in such a way that in the dominant state of the bus, in which the differential voltage of the signals CAN_H-CAN_L has a value of approximately 2V, the mean voltage is 2.5V. The switch resistances are balanced out by skillful dimensioning, for example, by adjustment or by control circuits, such as those described in German Patent Application No. DE 10250576A1.

However, it is problematic that the symmetrization during the switching operation is inadequate since one switch to VCC5 (pull-up switch) and one switch to GND (pull-down switch, GND=ground) have different characteristics. The total voltage at the switching point has voltage peaks (spikes), which result in a poor emission behavior in the high-frequency range, a range above 1 MHz. In the related art, these interfering voltage peaks are suppressed by a common mode choke. However, such a common mode choke is an additional component, causing additional costs and requiring additional space, which is usually available only to a very limited extent.

SUMMARY

An object of the present invention is to provide a subscriber station for a bus system and a method for solving the aforementioned problems. In particular, a subscriber station for a bus system and a method are provided, in which a symmetrization of the switching operation, a significant reduction in emitted interferences, an operation without a common mode choke and symmetrization of the dominant bus state are possible.

This object may be achieved by a subscriber station for a bus system in accordance with the present invention. The subscriber station includes an edge controller for symmetrizing switching edges in the bus system, the edge controller including an element for generating the setpoint voltage characteristic on a bus of the bus system and a current mirror for transmitting the generated setpoint voltage characteristic to the bus.

The subscriber station permits better control of the currents in CAN_H and CAN_L of the bus system statically and during the switching edges while switching from the dominant state to the recessive state and vice versa.

Furthermore, the subscriber station has a high immunity to injected interferences, which is verifiable by a DPI test (DPI=direct power injection), a BCI test (BCI=bulk current injection into the cable tree). The conventional rectification effects and storage effect are things of the past.

Moreover, in the subscriber station, an adjustability of the symmetrization is implementable in the final IC test (IC=integrated circuit), which relates to the OTP programming (OTP=one-time programmable (memory)). OTP programming is used for parameter and function adjustment of the ICs.

Another advantage of the example subscriber station is that operation without a common mode choke is possible.

Advantageous further embodiments of the subscriber station are described below.

For example, the element for generating the setpoint voltage characteristic may include a Miller capacitor, which is connected to a PMOS transistor at one end and to a resistor at the other end.

It is also possible for the element for generating the setpoint voltage characteristic to include two power sources which are connected to a PMOS transistor.

According to one example embodiment of the present invention, the edge controller includes two current sources, a Miller capacitor, a PMOS transistor and a resistor. The two current sources and the Miller capacitor may be connected here to the gate of the PMOS transistor.

The current mirror may be formed using MOS low-voltage transistors designed with an identical layout.

According to another option, the current mirror is connected to the bus via MOS high-voltage transistors. The MOS high-voltage transistors are cascode transistors with which an extensive isolation of the circuit of the edge controller from the bus is achieved.

The subscriber station may also have a reverse voltage protection diode for protection of the circuit against a potential of the dominant level in the bus system and a reverse voltage protection diode for protection against the signal CAN_L.

The subscriber station described previously may be part of a bus system, including a bus and at least two subscriber stations, which are interconnected via the bus in such a way that they are able to communicate with one another, at least one of the at least two subscriber stations being one of the subscriber stations described previously.

The object may also be achieved by a method for reducing line-related emissions in a bus system in accordance with the present invention. In an example method, an edge controller generates a setpoint voltage characteristic for symmetrization of switching edges in the bus system, including an element for generating a setpoint voltage characteristic, and transmits this to the bus via a current mirror.

This method offers the same advantages as those mentioned above with respect to the subscriber station.

Additional possible implementations of the present invention also include combinations, not mentioned explicitly, of features or specific embodiments described previously or hereinafter with respect to the exemplary embodiments. Those skilled in the art will also add individual aspects as improvements or additions to the respective basic form of the present invention.

BRIEF DESCRIPTION OF THE DRAWINGS

The present invention is described in greater detail below with reference to the figures and on the basis of exemplary embodiments.

In the figures, the same elements or elements having the same function are labeled with the same reference numerals unless otherwise indicated.

DETAILED DESCRIPTION OF EXAMPLE EMBODIMENTS

Figure 1:
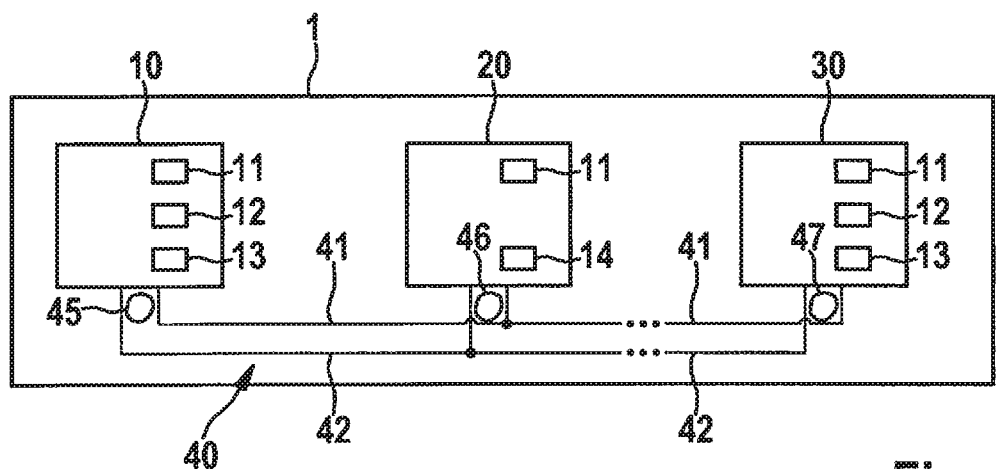
FIG. 1 shows a simplified block diagram of a bus system according to a first exemplary embodiment.

FIG. 1 shows a bus system 1, which may be a CAN bus system, a CAN-FD bus system, etc., for example. Bus system 1 may be used in a vehicle, in particular a motor vehicle, an airplane, etc. or in a hospital, etc.

Bus system 1 in FIG. 1 has a plurality of subscriber stations 10, 20, 30, each being connected to a bus 40, including a first bus core 41 and a second bus core 42. Bus cores 41, 42 may also be referred to as CAN_H and CAN_L and are used for input of the dominant levels in the transmission state. Messages 45, 46, 47 in the form of signals may be transmitted via bus 40 between the individual subscriber stations 10, 20, 30. Subscriber stations 10, 20, 30 may be control units or display devices in a motor vehicle, for example.

As shown in FIG. 1, subscriber stations 10, 30 each have a communication control unit 11, a transmitting unit 12 and a receiving unit 13. However, subscriber station 20 has a communication control unit 11 and a transmit/receive unit 14. Transmitting units 12, receiving units 13 of subscriber stations 10, 30 and transmit/receive unit 14 of subscriber stations 20 are each connected directly to bus 40, although this is not shown in FIG. 1.

Communication control unit 11 is used to control a communication of respective subscriber station 10, 20, 30 via bus 40 with another subscriber station of subscriber stations 10, 20, 30 connected to bus 40. Transmitting unit 12 is used to transmit messages 45, 47 in the form of signals and to reduce line-related emissions in bus system 1 to meet the signal symmetrization requirements of bus system 1, as described in greater detail below. Line-related emissions may occur on bus 40. Communication control unit 11 may be designed as a traditional CAN controller. Receiving unit 13 may be designed as a traditional CAN transceiver with respect to its reception functionality. Transmit/receive unit 14 may be designed as a traditional CAN transceiver.

Figure 2:
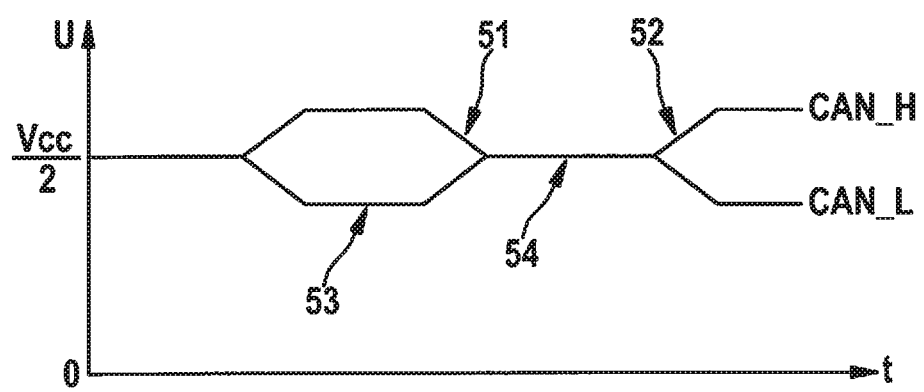
FIG. 2 shows a setpoint voltage characteristic of a bus signal over time in the bus system according to the first exemplary embodiment.
Figure 3:
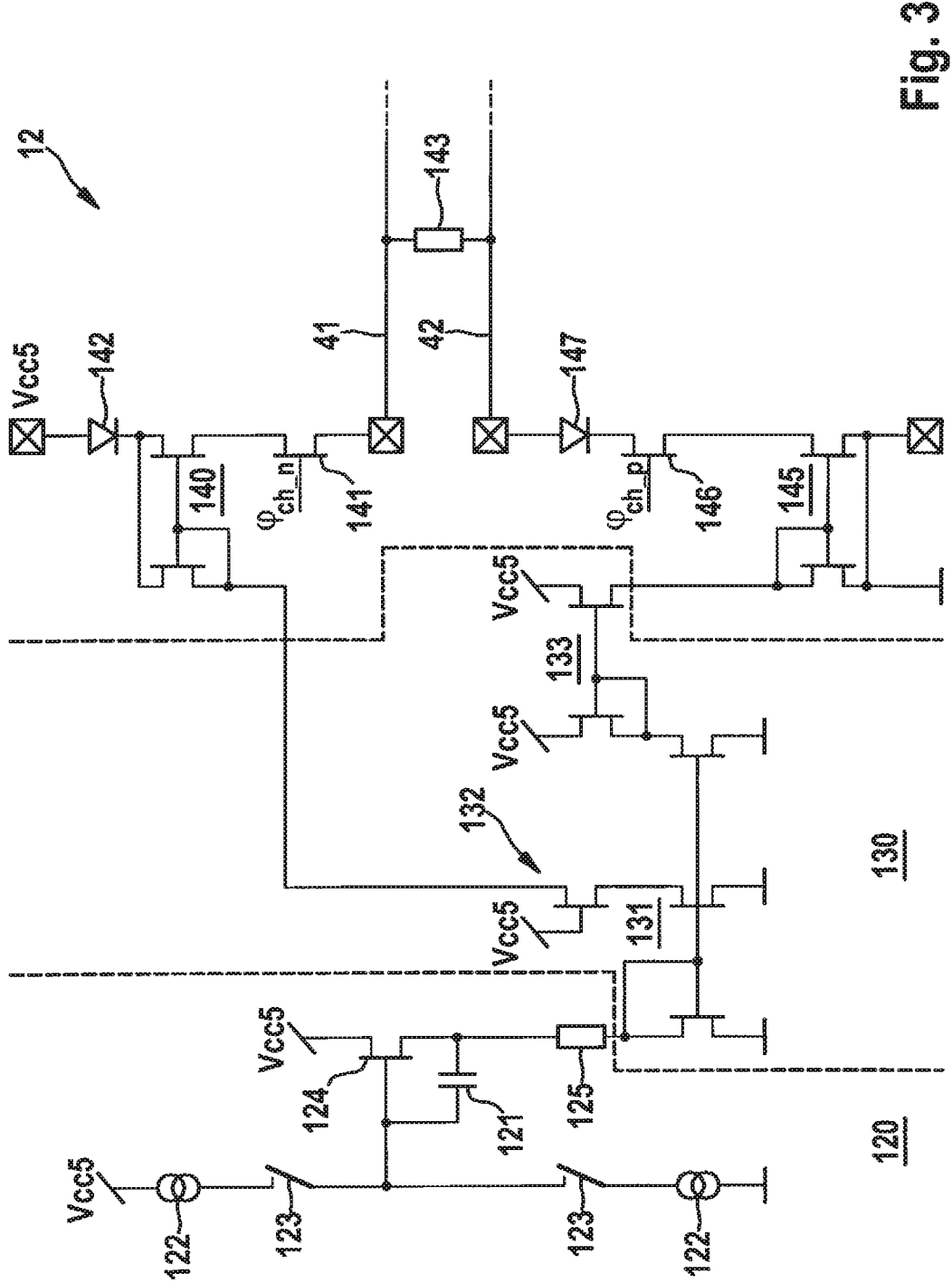
FIG. 3 shows an electrical circuit diagram of a signal symmetrization device of a subscriber station of the bus system according to the first exemplary embodiment.

FIG. 2 shows a voltage characteristic U over time t, having switching edges 51, 52, such as those generated by transmitting unit 12, which is shown in greater detail in FIG. 3. Switching edge 51 corresponds to a transition of the signal from dominant state 53 to recessive state 54. Switching edge 52 corresponds to a transition of the signal from recessive state 54 to dominant state 53. The voltage characteristic shown here has switching edges 51, 52 like a setpoint voltage characteristic to be generated by transmitting unit 12.

As shown in FIG. 3, transmitting unit 12 includes an edge controller 120 with the aid of a simulation of Miller capacitor 121 and current sources 122, an almost instantaneous current mirror 130, an output current mirror CAN_H 140 and an output current mirror CAN_L 145.

Edge controller 120 additionally includes switching elements 123 and a PMOS transistor 124 in addition to Miller capacitor 121 and current sources 122. Miller capacitor 121 is connected to the gate of PMOS transistor 124. Furthermore, current sources 122 are connected to the gate of PMOS transistor 124 via switching elements 123. Miller capacitor 121 is connected at its other end to the drain of PMOS transistor 124. A resistor 125 converts the voltage ramp generated at the drain of PMOS transistor 124 into a current signal for the input of a current mirror 131. Resistor 124 predefines the maximum short circuit current in bus core 41 (CAN_H) and bus core 42 (CAN_L).

Current mirror 130 also includes an NMOS high-voltage cascode 132, hereinafter also referred to as an NMOS HV cascode 132, and a PMOS current mirror 133 for low voltage in addition to an NMOS current bank 131. NMOS HV cascode 132 is connected to output current mirror 140. PMOS current mirror 133 is connected to output current mirror 145. Output current mirror CAN_H 140 is a PMOS current mirror for low voltage for CAN_H output current generation. Output current mirror CAN_L 145 is an NMOS current mirror for low voltage for CAN_L output current generation.

A PMOS high-voltage cascode 141, hereinafter also referred to as PMOS HV cascode 141, is connected to output current mirror CAN_H 140. PMOS HV cascode 141 is needed for an error case "short circuit of CAN_H to −27V." In addition, a reverse voltage protection diode 142 is connected to output current mirror CAN_H 140 for protecting the circuit against positive overvoltage from CAN_H. A negative potential φch_n relative to the positive voltage supply downstream from reverse voltage protection diode 142 is applied to PMOS HV cascode 141.

An NMOS high-voltage cascode 146, hereinafter also referred to as NMOS HV cascode 146, is connected to output current CAN_L 145. NMOS HV cascode 146 is needed for an error case of "short circuit CAN_L to 40V. In addition, a reverse voltage protection diode 147 is connected to output current mirror CAN_L 145. Reverse voltage protection diode 147 is needed in the fault case "short circuit CAN_L to −27V." A positive potential φch_p relative to ground is applied to NMOS HV cascode 146.

Between PMOS HV cascode 141 and reverse voltage protection diode 147, bus 40 is connected to bus cores 41, 42, which are connected to resistor 143. Resistor 143 thus has the same resistance as the characteristic wave impedance of bus 40, which is why there are no reflections on bus 40. Bus core 41 here stands for the transmission of signal CAN_H and bus core 42 stands for the transmission of signal CAN_L.

The circuit described above is greatly simplified with respect to resistor 143. In reality, two series-connected 60Ω resistors are present at the end of each line of bus cores 41, 42. The respective midpoint is set at 2.5V.

In transmitting unit 12 from FIG. 3, the setpoint voltage characteristic on bus 40 is generated internally with the aid of a replica element, which includes Miller capacitor 121, current sources 122, PMOS transistor 124 and resistor 125 and is then transmitted via current mirrors 140, 145 to bus 40. Edge controller is achieved with Miller capacitor 121, current sources 122, PMOS transistor 124 and resistor 125. Current mirrors 133, 140, 145 are formed with MOS low-voltage transistors of identical design in layout to obtain the same signal delays and the same saturation behavior in the CAN_H and CAN_L branches of the circuit shown in FIG. 3.

A method for reducing line-related emissions in bus system 1 is thus carried out using edge controller 120. Edge controller 120 generates a setpoint voltage characteristic on bus 40 using an element for generating the setpoint voltage characteristic for symmetrization of switching edges in bus system 1 and transmits this voltage characteristic to bus 40 via current mirror 130.

The required voltage strength is achieved with the aid of cascode steps formed from MOS high-voltage transistors, namely cascodes 132, 141, 146.

As is apparent from FIG. 3, the circuit of edge controller 120 is mostly isolated from bus 40, which is represented by bus cores 41, 42 and resistor 143. This advantage is achieved by the cascoding transistors, namely cascodes 132, 141, 146. Therefore, injected interferences, such as those caused by DPI, BCI, etc., are kept away from sensitive blocks, such as edge controller 120. The known rectification and storage effects are a thing of the past.

Thus, due to edge controller 120, the same currents are present on CAN_H and CAN_L during switching operations on bus 40, i.e., from recessive to dominant or vice versa. This yields ideal or almost ideal switching operations having the same internal resistance on CAN_H, bus core 41 and CAN_L, bus core 42. Current sources 122, Miller capacitor 121 over PMOS transistor 124 and resistor 125 are thus matched to the switching behavior in combination with bus 40, so that there are only minor common mode interferences.

According to a second exemplary embodiment, the dominant bus state is symmetrized which corresponds to dominant state 53. More specifically, the ratio of currents in the direction of output current mirror CAN_H 140 and output current mirror CAN_L 145 is equalized. Thus, current faults in various signal paths, which could occur due to component mismatching, are preventable. NMOS current bank 131 is advantageously formed adjustably. Otherwise bus system 1 is constructed as described in the first exemplary embodiment.

All embodiments of bus system 1, subscriber stations 10, 30, transmitting unit 12 and the method described previously may be used individually or in all possible combinations. In particular, an arbitrary combination of features of the exemplary embodiments is possible. In addition, the following modifications are conceivable in particular.

Bus system 1 according to the exemplary embodiments is a CAN network or a CAN-FD network or a FlexRay network in particular.

The number and arrangement of subscriber stations 10, 20, 30 in bus system 1 of the exemplary embodiments is arbitrary. In particular there may also be only subscriber stations 10 or only subscriber stations 30 or only subscriber stations 10, 30 in bus system 1 of the exemplary embodiments.

Subscriber stations 10, 30 described previously and the method carried out by them may be used to particular advantage in a modified data protocol, which was published on 2 May 2011 in the document "CAN with Flexible Data Rate, White Paper, version 1.0" on the website http://www.semiconductors.bosch.de/ and enables, among other things, an increase in size of the data field and a shortening of the bit length for a portion of the CAN message after completed arbitration.

Subscriber stations 10, 30 represent one option for increasing the transmission quality of CAN-FD into the range of conventional CAN transmissions by utilizing a much higher data rate for CAN-FD in particular.

The functionality of the exemplary embodiments described previously may also be implemented in a transceiver, i.e., a transmit/receive unit 13, or in a communication control unit 11, etc. Additionally or alternatively, transmitting unit 12 may be integrated into existing products.

What is claimed is:

1. A subscriber station for a bus system, comprising:
an edge controller for symmetrization of switching edges in the bus system, the edge controller including an element for generating a setpoint voltage characteristic on a bus of the bus system; and
a current mirror for transmitting the generated setpoint voltage characteristic to the bus, wherein:
the element for generating the setpoint voltage characteristic includes a Miller capacitor, which is connected to a gate of a PMOS transistor at a first end and to a drain of the PMOS transistor and a resistor at a second end,
the element for generating the setpoint voltage characteristic includes two current sources which are connected to each other at a common node, and
the two current sources are connected via the common node to the gate of the PMOS transistor and to the first end of the Miller capacitor.

2. The subscriber station as recited in claim 1, wherein the current mirror is formed with MOS low-voltage transistors having an identical structure in the layout.

3. The subscriber station as recited in claim 1, wherein the current mirror is connected to the bus via MOS high-voltage transistors.

4. The subscriber station as recited in claim 1, further comprising:
a reverse voltage protection diode for protecting against a potential of a dominant level in the bus system; and
a reverse voltage protection diode against a signal CAN_L.

5. A bus system, comprising:
a bus; and
at least two subscriber stations connected to one another via the bus in such a way that the subscriber stations are able to communicate with one another, wherein at least one of the at least two subscriber stations includes: i) an edge controller for symmetrization of switching edges in the bus system, the edge controller including an element for generating a setpoint voltage characteristic on a bus of the bus system, and ii) a current mirror for transmitting the generated setpoint voltage characteristic to the bus, wherein:
the element for generating the setpoint voltage characteristic includes a Miller capacitor, which is connected to a gate of a PMOS transistor at a first end and to a drain of the PMOS transistor and a resistor at a second end,
the element for generating the setpoint voltage characteristic includes two current sources which are connected to each other at a common node, and
the two current sources are connected via the common node to the gate of the PMOS transistor and to the first end of the Miller capacitor.

6. A method for reducing line-related emissions in a bus system, comprising:
generating, by an edge controller for symmetrizing switching edges in the bus system, a setpoint voltage characteristic on a bus of the bus system using an element for generating the setpoint voltage characteristic; and
transmitting the setpoint voltage characteristic to the bus via a current mirror, wherein:
the element for generating the setpoint voltage characteristic includes a Miller capacitor, which is connected to a gate of a PMOS transistor at a first end and to a drain of the PMOS transistor and a resistor at a second end, the element for generating the setpoint voltage characteristic includes two current sources which are connected to each other at a common node, and the two current sources are connected via the common node to the gate of the PMOS transistor and to the first end of the Miller capacitor.

* * * * *